Feb. 10, 1953 J. J. PATERNO 2,628,262
BATTERY CONNECTOR
Filed Jan. 20, 1948

Inventor
Joseph J. Paterno
by Roberts, Cushman & Grover
Atty's

Patented Feb. 10, 1953

2,628,262

UNITED STATES PATENT OFFICE 2,628,262

BATTERY CONNECTOR

Joseph J. Paterno, Salem, Mass.

Application January 20, 1948, Serial No. 3,292

3 Claims. (Cl. 173—259)

The type of battery connector generally used for joining an electrical conductor to a terminal post of a battery is subject to corrosion by the chemical action of the battery electrolyte. Unless periodically removed such corrosion progressively increases the electrical resistance and decreases the mechanical strength until a breakdown of the connector occurs. Seizing of the connector upon the battery post may also be caused by the corrosion so that it is difficult and sometimes impossible to remove the connector without damaging the battery.

Objects of this invention are to provide a connector for joining an electrical conductor to the post of a battery which is not subjected to corrosion by the battery electrolyte, which clamps securely upon the battery post, which may be installed and removed easily without the use of a tool, and which improves the art of electrical connector manufacture generally.

In a broad aspect the invention contemplates a connector for joining an electrical conductor to the post of a battery comprising a sleeve member with one or more longitudinal slots therein and adapted to be positioned circumjacent to battery posts. The bottom of the sleeve has a recessed aperture therein which is adapted to receive an anticorrosion material. The sleeve is clamped to the post by an engaging member and means are provided to attach the conductor to the connector.

In another aspect the upper end of the sleeve member is engaged by a member for clamping the sleeve to the post. The lower end of the sleeve has an extension for attaching the electrical conductor with a recessed aperture in the bottom thereof which is adapted to receive an anticorrosion material, for example a heavy petroleum base grease.

In a specific aspect the connector comprises a longitudinally slotted sleeve having a tapered internal surface adapted to be positioned circumjacent to the post and an externally threaded upper end for engaging an internal thread for clamping the sleeve to the post. The lower end of the sleeve has an extension for attaching the electrical conductor with a recessed aperture in the bottom thereof housing a washer preferably of felt or other absorbent material. The passages connecting with the aperture are provided for impregnating the washer with an anticorrosion material for example a petroleum base oil.

These and other objects and aspects of the invention will be apparent with reference to the following specification and drawing in which.

Figure 1:
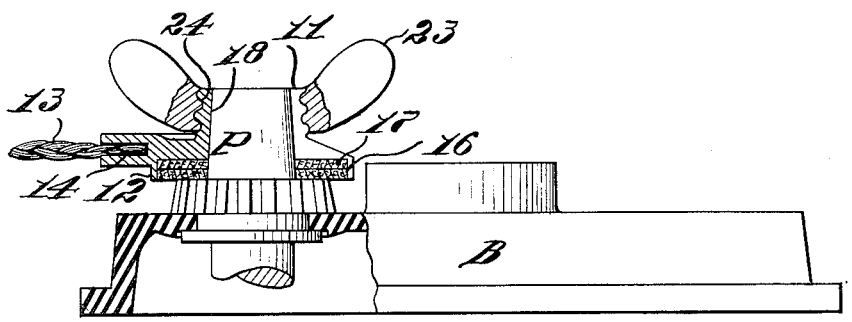
Fig. 1 is a side elevation, in partial section, of an installation of one embodiment of the invention upon the terminal post of a battery.
Figure 2:
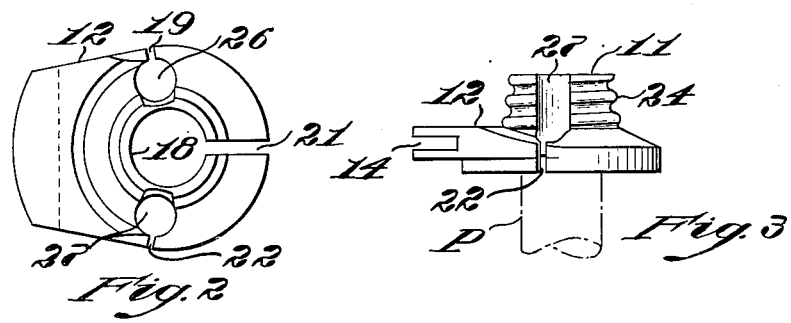
Fig. 2 is a plan view of this embodiment with the engaging member removed.
Figure 3:
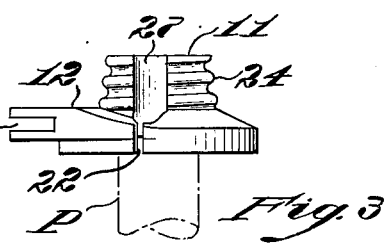
Fig. 3 is a side elevation of the same embodiment.

In the particular embodiment of the invention chosen for the purpose of illustration, the connector comprises a sleeve member 11 with an extension such as the flange 12 at the lower end thereof. The flange 12 has a connection such as the slot 14 adapted to receive an electrical conductor such as a strap 13. The strap 13 is secured in the slot 14 by soldering, brazing, crimping or any other well-known means. The bottom of the flange 12 has a recessed aperture 16 therein which is adapted to receive a foraminous washer 17 made of felt or other absorbent material. The washer is impregnated with an anticorrosion material such as an oil with a petroleum base.

The sleeve member 11 has a tapered internal or inner surface 18 adapted to be positioned circumjacent a terminal post P of a storage battery B, shown in Fig. 1. Three longitudinal slots 19, 21 and 22 are provided in the sleeve member 11 so that the threading of an engaging member, such as the wing nut 23 upon the external thread 24 of its outer surface clamps the sleeve 11 to the post P.

The two slots 19 and 22 in diametrically opposing positions are enlarged to form the passages 26 and 27 respectively. These passages 26 and 27 connect with the aperture 16 so that the anticorrosion material impregnating the washer 17 may be periodically renewed.

Figure 4:
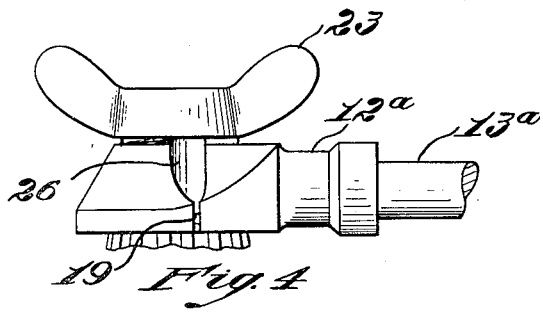
Fig. 4 is a side elevation of another embodiment of the invention.

Another embodiment of the invention is shown in Fig. 4 wherein a flange 12a is adapted to receive a conductor of circular cross section such as the wire 13a. The remainder of the connector is similar in construction to the embodiment described heretofore.

The connector is installed readily without the use of a wrench or other tool. The wing nut 23 is loosened and the tapered surface 18 positioned circumjacent the battery post P. The connector is then clamped to the post by tightening the wing nut 23 manually. As the wing nut 23 need be only finger tight to secure an adequate clamping action, the nut can be readily disengaged so that the connector can be removed without damage to the battery B.

An occasional drop of a petroleum based oil in the passages 26 and 27 keeps the washer 17 impregnated thereby preventing the electrolyte from corroding the connector and increasing its electrical resistance. The prevention of corrosion also eliminates seizing of threads so that the connector can be easily removed from the post.

It should be understood that the present disclosure is for the purpose of illustration only and that this invention includes all modifications and equivalents which fall within the scope of the appended claims.

I claim:

1. A connector for joining an electrical conductor to a terminal post comprising a hollow sleeve member of an electrically conducting material having an aperture for engaging said post, a rigid integral flange extending radially from the lower end of said sleeve, the bottom surface of said flange lying in a plane substantially normal to the axis of said aperture, the upper surface of the flange being angularly disposed with respect to its bottom surface so as to increase the axial stiffness of the flange, connecting means for securing said conductor to said flange, said sleeve member and flange having a longitudinal slot extending therethrough, means for compressing the sleeve member to clamp the member to the battery post, the bottom surface of the flange being stepped inwardly to form a cylindrical recess adjoining the lower end of the post aperture, and a foraminous washer of a nonconducting material impregnated with an anticorrosion material, said washer being disposed in said recess with its inner diameter engaging the post, said flange being provided with an aperture extending lengthwise therethrough on either side of said longitudinal slot for renewing the anticorrosion material in said washer without the necessity of removing the connector from the post, said apertures extending outwardly to the edge of said flange permitting the flange to yield circumferentially as the connector is clamped to the post.

2. A connector for joining an electrical conductor to a terminal post extending from the top of a battery case comprising a hollow sleeve member of an electrically conducting material having a tapered aperture for engaging said post, a rigid integral flange extending radially from the lower end of said sleeve, the bottom surface of said flange lying in a plane substantially normal to the axis of said aperture, the upper surface of the flange being angularly disposed with respect to its bottom surface so as to increase the axial stiffness of the flange, connecting means for securing said conductor to said flange, said sleeve member and flange having a longitudinal slot extending therethrough, the upper end of said sleeve being provided with external threads, an internally threaded member for engaging the threads of the sleeve member, the threads on at least one of the members being tapered so that the sleeve member is clamped to the battery post as the threads upon the respective members are engaged, the bottom surface of the flange being stepped inwardly to form a cylindrical recess adjoining the larger end of the tapered aperture, and a foraminous washer of a nonconducting material impregnated with an anticorrosion material, said washer being disposed in said recess with its inner diameter engaging the post, said flange being provided with an aperture extending lengthwise therethrough on either side of said longitudinal slot for renewing the anticorrosion material in said washer without the necessity of removing the connector from the post, said apertures extending outwardly to the edge of said flange permitting the flange to yield circumferentially as the connector is clamped to the post.

3. For use with a battery of the type wherein the terminal post is secured to the battery casing by means of a circular nut, a connector comprising a hollow sleeve member of an electrically conducting material having a tapered aperture for engaging said post, a rigid integral flange extending radially from the lower end of said sleeve, the bottom surface of said flange lying in a plane substantially normal to the axis of said aperture, the upper surface of the flange being angularly disposed with respect to its bottom surface so as to increase the axial stiffness of the flange, connecting means for securing said conductor to said flange, said sleeve member and flange having a longitudinal slot extending therethrough, the upper end of said sleeve being provided with external threads, an internally threaded member for engaging the threads of the sleeve member, the threads on at least one of the members being tapered so that the sleeve member is clamped to the battery post as the threads upon the respective members are engaged, the bottom surface of the flange being stepped inwardly to form a cylindrical recess adjoining the larger end of the tapered aperture, and a foraminous washer of a nonconducting material impregnated with an anticorrosion material, said washer being disposed in said recess with its inner diameter engaging the post, the thickness of the washer being at least as great as the depth of the recess and its outer diameter being greater than the diameter of the circular nut, said flange being provided with an aperture extending lengthwise therethrough on either side of said longitudinal slot for renewing the anticorrosion material in said washer without the necessity of removing the connector from the post, said apertures extending outwardly to the edge of said flange permitting the flange to yield circumferentially as the connector is clamped to the post.

JOSEPH J. PATERNO.

REFERENCES CITED

The following references are of record in the file of this patent:

UNITED STATES PATENTS

| Number | Name | Date |
| --- | --- | --- |
| 1,633,176 | Goeller | June 21, 1927 |
| 1,671,016 | Dewey | May 22, 1928 |
| 1,794,757 | Cutler | Mar. 3, 1931 |
| 1,924,334 | Tauber | Aug. 29, 1933 |
| 1,961,955 | Berryman | June 5, 1934 |
| 1,995,184 | Levi | Mar. 19, 1935 |
| 2,050,566 | Farley | Aug. 11, 1936 |
| 2,269,296 | Weaver | Jan. 6, 1942 |
| 2,487,917 | Adams | Nov. 15, 1949 |